United States Patent
Ratti et al.

(10) Patent No.: US 12,078,150 B2
(45) Date of Patent: Sep. 3, 2024

(54) WAKING A WIND TURBINE FROM A SLEEP STATE

(71) Applicant: VESTAS WIND SYSTEMS A/S, Aarhus N. (DK)

(72) Inventors: Carlo Alberto Ratti, Oporto (PT); Johnny Nielsen, Svenstrup J (DK); Jens Van Schelve, Oporto (PT)

(73) Assignee: VESTAS WIND SYSTEM A/S, Aarhus (DK)

( * ) Notice: Subject to any disclaimer, the term of this patent is extended or adjusted under 35 U.S.C. 154(b) by 0 days.

(21) Appl. No.: 17/766,983

(22) PCT Filed: Oct. 9, 2020

(86) PCT No.: PCT/DK2020/050281
§ 371 (c)(1),
(2) Date: Apr. 6, 2022

(87) PCT Pub. No.: WO2021/069045
PCT Pub. Date: Apr. 15, 2021

(65) Prior Publication Data
US 2024/0077058 A1    Mar. 7, 2024

(30) Foreign Application Priority Data
Oct. 9, 2019  (DK) .......................... PA 2019 70631

(51) Int. Cl.
*F03D 7/02*       (2006.01)
*F03D 7/04*       (2006.01)

(52) U.S. Cl.
CPC ............ *F03D 7/026* (2013.01); *F03D 7/046* (2013.01); *F05B 2270/3202* (2020.08)

(58) Field of Classification Search
CPC .................... F03D 7/026; F05B 2270/3202
See application file for complete search history.

(56) References Cited

U.S. PATENT DOCUMENTS

| | | | |
|---|---|---|---|
| 4,464,579 A | 8/1984 | Schwarz | |
| 10,309,372 B2* | 6/2019 | Huyn | H02K 7/183 |

(Continued)

FOREIGN PATENT DOCUMENTS

| | | |
|---|---|---|
| CN | 101159423 A | 4/2008 |
| CN | 101228351 A | 7/2008 |

(Continued)

OTHER PUBLICATIONS

Danish Patent and Trademark Office, 1st Technical Examination including The Search Report and Search Opinion for Application PA 2019 70631 dated Feb. 27, 2020.

(Continued)

*Primary Examiner* — Pedro J Cuevas
(74) *Attorney, Agent, or Firm* — Patterson + Sheridan, LLP

(57) ABSTRACT

A method of transitioning a wind turbine from a sleep state is provided in which a wind speed at the wind turbine is measured, and the measured wind speed is compared to a wake-up threshold. If the wind speed exceeds the wake-up threshold, the wind turbine is transitioned to an active state. Before comparing, either the measured wind speed or the wake-up threshold is adjusted based on an outcome of at least one previous transition from the sleep state of the wind turbine.

20 Claims, 3 Drawing Sheets

(56) References Cited

U.S. PATENT DOCUMENTS

| | | | |
|---|---|---|---|
| 2008/0238100 A1 | 10/2008 | Altemark | |
| 2016/0363982 A1 | 12/2016 | Forest et al. | |
| 2018/0355848 A1* | 12/2018 | Wei | F03D 7/026 |
| 2019/0243329 A1* | 8/2019 | Louco | G05B 19/102 |
| 2022/0403819 A1* | 12/2022 | Spagnolo | F03D 7/026 |

FOREIGN PATENT DOCUMENTS

| | | |
|---|---|---|
| CN | 101629553 A | 1/2010 |
| DE | 102016015133 A1 | 6/2018 |
| EP | 2146095 A2 | 1/2010 |
| EP | 2840257 A1 | 2/2015 |
| EP | 2910777 A1 | 8/2015 |
| WO | 2018108795 A1 | 6/2018 |
| WO | 2018224110 A1 | 12/2018 |
| WO | 2019042751 A1 | 3/2019 |
| WO | 2021069045 A1 | 4/2021 |

OTHER PUBLICATIONS

PCT, Notification of Transmittal of The International Search Report and The Written Opinion of The International Searching Authority, or The Declaration for Application PCT/DK2020/050281 dated Jan. 15, 2021.

European Patent Office, Communication Pursuant to Article 94(3) EPC for European Patent Application No. 20792529.8, dated Jan. 4, 2024.

China Patent Office, Office Action for Chinese Patent Application No. 202080082374.6, dated Jun. 7, 2024.

* cited by examiner

WAKING A WIND TURBINE FROM A SLEEP STATE

FIELD OF THE INVENTION

The present invention relates to control of a wind turbine, and in particular to transitions between operational states of a wind turbine disconnected from an external power grid.

BACKGROUND OF THE INVENTION

Wind turbines are operated in a variety of different operational states, with transitions between operational states often depending upon the current wind speed. For example, a wind turbine may be operated in a power production state when the wind speed is suitable for power production, and an idling state when wind speed is too low to sustain power production.

During periods of disconnection from the external power grid, such as a utility grid failure of a country or a region, certain wind turbines rely on self-generated back-up power to sustain themselves. Such wind turbines may also have a sleep operational state, in which a number of components or sub-systems of the wind turbine are switched off to conserve power during very low wind speeds. Waking the wind turbine from such a sleep state can require a large amount of energy. If the wind speed is not yet high enough to sustain a higher operational mode, the transition from the sleep state can fail, wasting the expended energy.

SUMMARY OF THE INVENTION

A first aspect of the invention provides a method of transitioning a wind turbine from a sleep state, in the sleep state the wind turbine being disconnected from an external power grid and being powered by an internal power source, in the sleep state the wind turbine is not providing power to non-essential systems and is providing power to essential systems, the essential systems include a wind sensor at the wind turbine and sub-control system to which the wind sensor is connected, the method comprising:
  measuring a wind speed using the wind sensor at the wind turbine to obtain a measured wind speed;
  comparing the measured wind speed to a wake-up threshold; and
  if the wind speed exceeds the wake-up threshold, transitioning the wind turbine from the sleep state to an active state, in the active state the wind turbine remain disconnected from the external power grid and remain powered by the internal power source, in the active state the wind turbine is providing power to at least some non-essential systems;
  wherein before comparing, either the measured wind speed or the wake-up threshold is adjusted based on an outcome of at least one previous transition from the sleep state of the wind turbine In the sleep state as well as in the active state the turbine is disconnected from an external power grid, e.g. due to fault on the power grid or maintenance work on the power grid. During this period, the wind turbine is powered by an internal power source, typically in the form of on-board rechargeable batteries. In the sleep state, the wind turbine has disconnected the power to non-essential systems and is only providing power to essential systems, in this manner the limited power capacity of the internal power source can provide power to the wind turbine for a prolonged time. In the active state the wind turbine has 'wakes up' further systems which utilize power from the internal power source.

Essential systems include at least a wind sensor and a sub-control system (sleep controller) for receiving the measured wind speed as input. The sub-controller further being capable of transition the wind turbine from the sleep state to the active state, hereunder ensure that further systems can use power, e.g. by operating switches which enable such system to operate. The sub-controller also being capable of operating the comparing steps and adjusting the wake-up threshold and/or the measured wind speed, as well as further controller tasks needed during sleep and wake-up.

The essential systems may include, further part of the control system, hereunder the entire control system. The control system may comprise a number of controller system components, including a main controller, a number of sub-controllers and switches of an internal control communication system. In an embodiment a part of the control system components may be assigned as essential system whereas a part of the control system components may be assigned as non-essential system.

The essential system may also comprise, aviation lights and internal lights, elevator system, and certain lubrication system.

The non-essential systems may further comprise such systems as pitch system and power production system.

In some embodiments, if the outcome of the at least one previous transition was a failed transition from the sleep state, adjusting the measured wind speed or wake-up threshold may comprise:
  reducing the measured wind speed or increasing the wake-up threshold.

In some embodiments, if the outcome of the at least one previous transition was a successful transition from the sleep state, adjusting the measured wind speed or wake-up threshold may comprise:
  increasing the measured wind speed or decreasing the wake-up threshold.

In some embodiments, adjusting the measured wind speed or wake-up threshold may comprise:
  determining the number of successful and failed transitions in a plurality of previous transitions of the wind turbine; and
  adjusting the measured wind speed or wake-up threshold based on the number of successful and/or failed transitions.

In some embodiments, the transitions in the plurality of previous transitions may comprise a predetermined number of the most-recent transitions from the sleep state of the wind turbine.

In some embodiments, adjusting the measured wind speed or wake-up threshold may comprise reducing the measured wind speed or increasing the wake-up threshold by a first adjustment for each failed transition in the plurality of transitions; and/or increasing the measured wind speed or reducing the wake-up threshold by a second adjustment for each successful transition in the plurality of transitions. The first adjustment may be less than the second adjustment. The first adjustment and/or second adjustment may be based on the magnitude of the success or failure of the respective transition.

In some embodiments adjusting the measured wind speed or wake-up threshold may comprise applying a previously determined adjustment to the respective one of the measured wind speed and wake-up threshold.

In some embodiments an outcome of a previous transition may be determined to be a success if the transition to an active state was achieved within a predetermined time. Alternatively or additionally, an outcome of a previous transition may be determined to be a success if a rotor speed or power generation of the turbine exceeds a predetermined threshold.

An active state may be a state in which power is generated by the wind turbine. In some embodiments the active state may be a charging state of the wind turbine. A charging state may be considered a production state of the wind turbine in which power can be used to recharge the turbine's power back-up battery/batteries, but in which power is not supplied to the grid (for example due to an unavailability of the grid). Thus in the active state, the produced power is provided to the internal power source to charge the internal power source, typically in the form of power back-up battery/batteries.

In an embodiment, the active state is a power producing state of the wind turbine where the produced power is provided to a power consumer not being the external power grid or connected to the external power grid. Such power consumer may e.g. be an electrolysis plant, e.g. for use in a power-to-X process utilizing a wind turbine as power source.

A second aspect of the invention provides a wind turbine comprising:
  a wind speed measurement system; and
  a controller configured to receive a wind speed measurement from the wind speed measurement system;
  wherein the controller is configured to perform the method of any embodiment of the first aspect.

A third aspect of the invention comprises a computer program comprising instructions which, when the program is executed by a computer, cause the computer to carry out the method of any embodiment of the first aspect.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
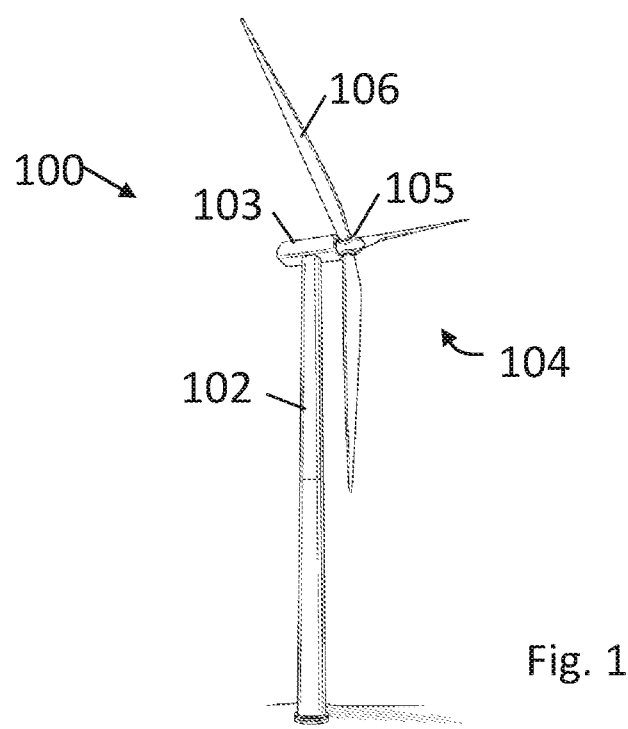
FIG. 1 illustrates, in a schematic perspective view, an example of a wind turbine.

FIG. 1 illustrates, in a schematic perspective view, an example of a wind turbine 100. The wind turbine 100 includes a tower 102, a nacelle 103 at the apex of the tower, and a rotor 104 operatively coupled to a generator housed inside the nacelle 103. In addition to the generator, the nacelle houses miscellaneous components required for converting wind energy into electrical energy and various components needed to operate, control, and optimize the performance of the wind turbine 100. The rotor 104 of the wind turbine includes a central hub 105 and a plurality of blades 106 that project outwardly from the central hub 105. In the illustrated embodiment, the rotor 104 includes three blades 106, but the number may vary. Moreover, the wind turbine comprises a control system. The control system may be placed inside the nacelle or distributed at a number of locations inside the turbine and communicatively connected.

The wind turbine 100 may be included among a collection of other wind turbines belonging to a wind power plant, also referred to as a wind farm or wind park, that serve as a power generating plant connected by transmission lines with a power grid. The power grid generally consists of a network of power stations, transmission circuits, and substations coupled by a network of transmission lines that transmit the power to loads in the form of end users and other customers of electrical utilities.

Figure 2:
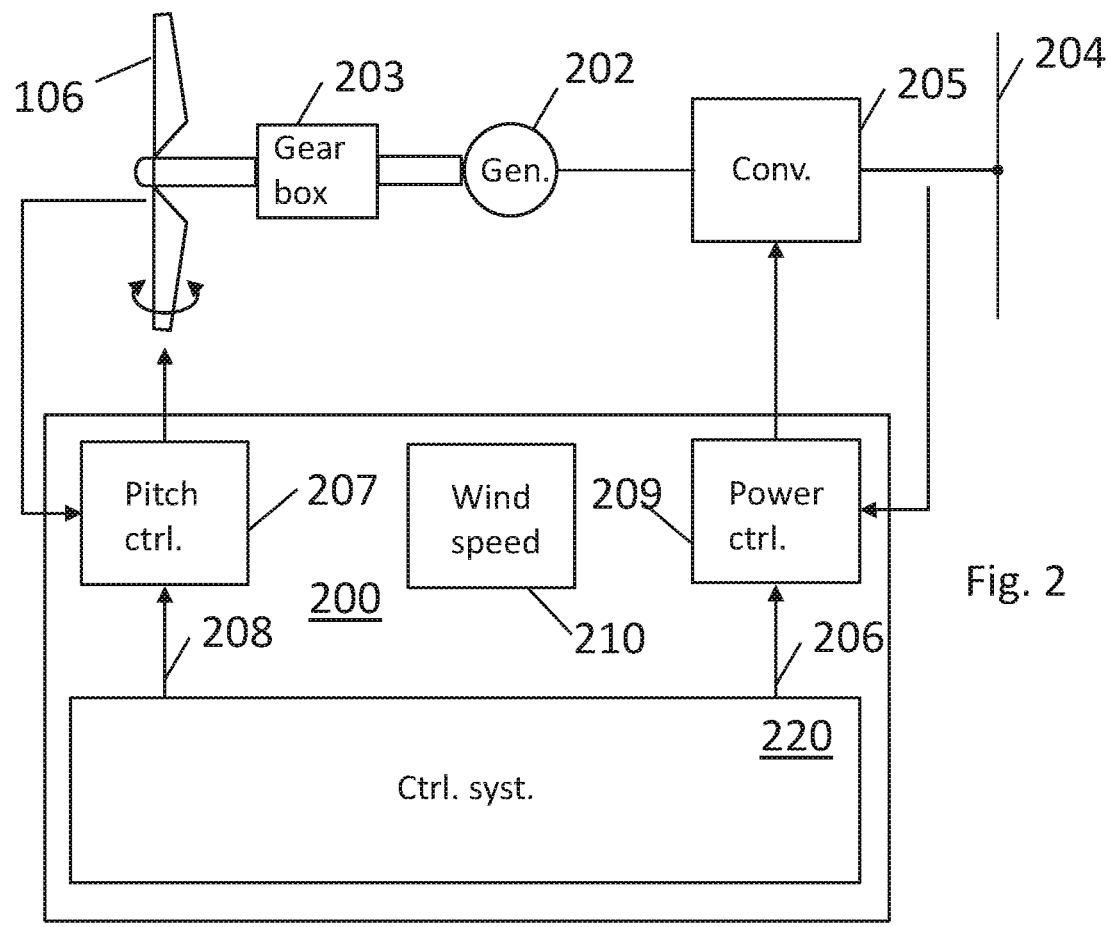
FIG. 2 schematically illustrates an embodiment of a control system together with elements of a wind turbine.

FIG. 2 schematically illustrates an embodiment of a control system 200 together with elements of a wind turbine. The wind turbine comprises rotor blades 106 which are mechanically connected to an electrical generator 202 via gearbox 203. In direct drive systems, and other systems, the gearbox 203 may not be present. The electrical power generated by the generator 202 is injected into a power grid 204 via an electrical converter 205. The electrical generator 202 and the converter 205 may be based on a full scale converter (FSC) architecture or a doubly fed induction generator (DFIG) architecture, but other types may be used.

In a situation where the external power grid 204 is disconnected, in addition to that the turbine is not able to provide power to the power grid, the turbine is normally not able to get power from the power grid, and therefore the power consuming systems of the wind turbine needs to be powered by an internal power source. The power required to power the on-board systems is distributed via an internal power system which connects the various power consumers to the internal power source. The internal power source is generally in the form of batteries.

The control system 200 comprises a number of elements, including at least one main controller 220 with a processor and a memory, so that the processor is capable of executing computing tasks based on instructions stored in the memory. The control system may comprise a number of sub-controllers connected via an internal controller network, the controller network comprising switches for handling the control signals. In general, the wind turbine controller ensures that in operation the wind turbine generates a requested power output level. This is obtained by adjusting the pitch angle of the blades 106 and/or the power extraction of the converter 205. To this end, the control system comprises a pitch system including a pitch controller 207 using a pitch reference 208, and a power system including a power controller 209 using a power reference 206. The wind turbine rotor comprises rotor blades that can be pitched by a pitch mechanism. The rotor comprises an individual pitch system which is capable of individual pitching of the rotor blades, and may comprise a common pitch system which adjusts all pitch angles on all rotor blades at the same time. The control system, or elements of the control system, may be placed in a power plant controller (not shown) so that the turbine may be operated based on externally provided instructions.

The control system 200 further comprises a wind speed measurement system 210, configured to determine a current wind speed experienced by the wind turbine 100 (e.g. a free stream wind speed). Wind speed measurement system 200 may comprise or may receive a signal from a wind speed sensor, such as an anemometer on the nacelle 103. The wind speed measurement system 210 may be incorporated into the main controller 220, or any other controller or system of the wind turbine 100, hereunder a dedicated sub-controller.

The various systems of the wind turbine 100, such as the electronics of the control system 200, require some power to operate. The power produced by the wind turbine 100 itself may be used to power the on-board systems. However, when wind speed is low, the wind turbine 100 may not produce enough power to sustain all of the on-board systems. Most wind turbines may take power from the grid 204 in such circumstances. However, in some cases the grid is not available and instead a local generator such as a diesel generator is used to generate the required electricity, either to directly power the systems or to recharge the batteries.

It is preferable to remove the need for a diesel engine, and instead use an on-board battery to power the electronics, charging the batteries using the wind turbine 100 itself when wind speed is sufficient. A wind turbine 100 may be placed in a charging state, in which power is generated and provided to the battery, when the grid 204 is not available. However, there may still be times where the wind speed is too low even to charge the battery. In such situations, the wind turbine may be placed in a sleep state, in which all but a select group of essential systems are switched off or into a low-power/stand-by mode. The retained essential systems may particularly include a wind speed measurement system to monitor the wind speed at the wind turbine 100. If the wind speed increases above a predetermined threshold, the wind turbine may be 'woken up'—i.e. transitioned from the sleep state to an active state, such as the charging state (depending on the wind speed, and if the grid 204 is available).

Waking the wind turbine 100, involving turning on the dormant on-board systems, is energy intensive. If the transition to the active state fails, for example because sufficient rotor speed is not achieved, then a lot of energy will have been wasted. If too much energy is wasted, the turbine 100 may run out of back-up power.

It has been realised that failed turbine wake-ups may be caused by incorrect wind speed readings. For example, a wind speed sensor of the turbine 100 may be inaccurate, or badly calibrated, or there may be local disturbances in wind speed at the turbine that trigger a false wake-up determination. Wind speed sensors can only be calibrated up to a certain level, and correcting for local wind disturbances a priori may be impossible, making it difficult to avoid these wind speed inaccuracies.

Figure 3:
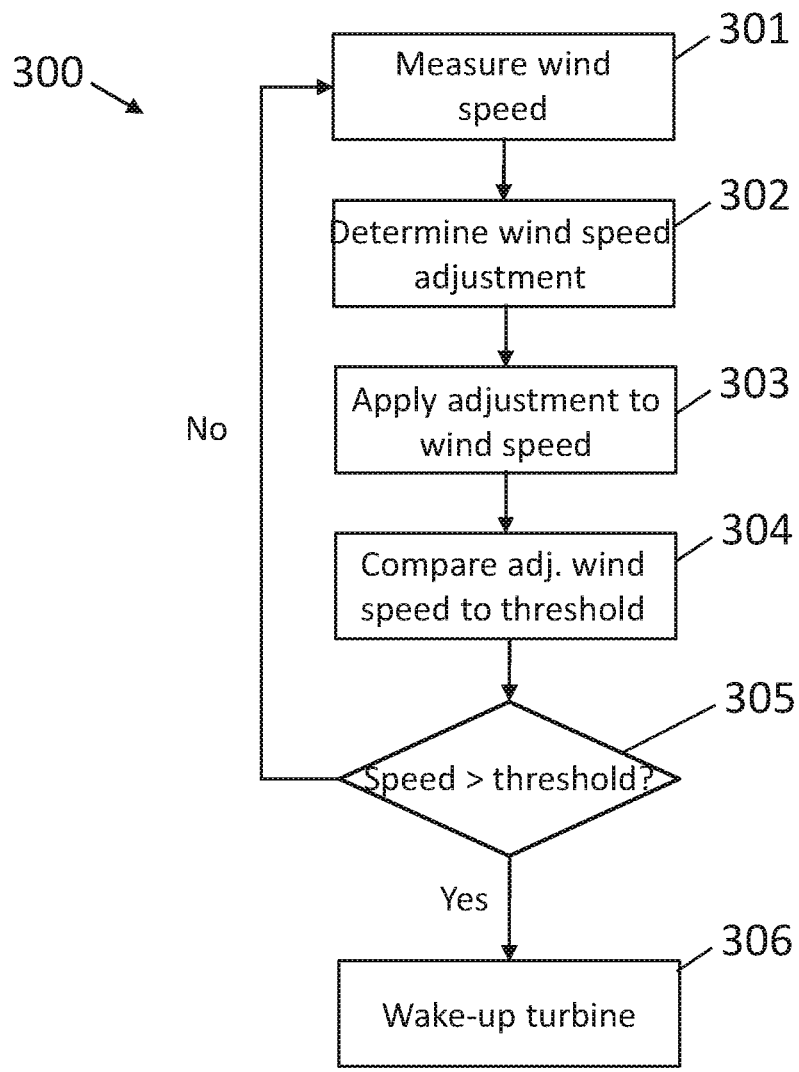
FIG. 3 illustrates a method of transitioning a wind turbine from a sleep state.
Figure 4:
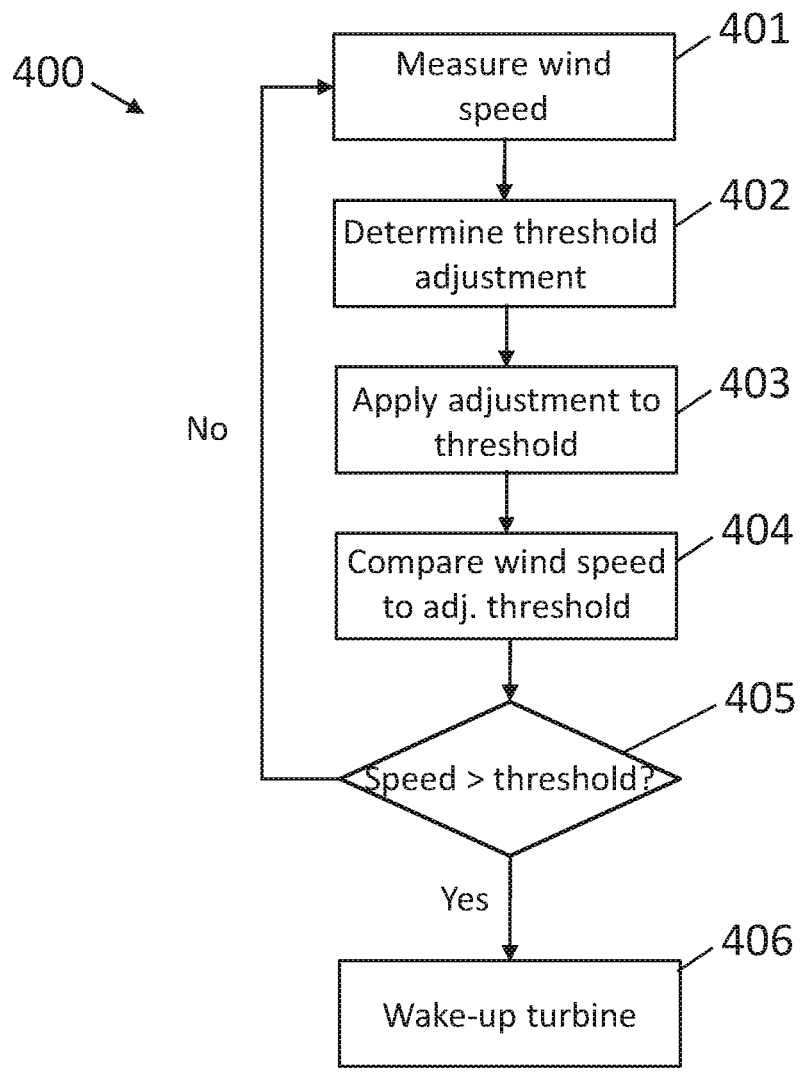
FIG. 4 illustrates an alternative method of transitioning a wind turbine from a sleep state.

FIGS. 3 and 4 illustrate methods 300, 400 of transitioning a wind turbine 100 from a sleep state to an active state which seeks to overcome such problems. Methods 300, 400 use the recent history of successes and failures of wake-ups for that specific turbine 100 to 'correct' measured wind speeds and/or the wake-up threshold, to reduce any positive and/or negative bias in the turbine's wind speed measurements, and so reduce the chance of a wake-up failure.

As shown in FIG. 3, method 300 starts at step 301, at which a wind speed at the wind turbine 100 is measured to obtain a measured wind speed.

The wind speed may be measured by the wind speed measurement system 210 of the turbine 100, which may be part of the control system 200, or may feed a signal indicative of the measured wind speed to the control system 200. The wind speed measurement system 210 may comprise a wind speed sensor such as an anemometer, for example positioned on the nacelle 103 of the turbine 100. The wind speed measurement system 210 may comprise a controller configured to receive a signal from the wind speed sensor. The controller may be incorporated into another controller of the wind turbine 100, such as a main controller 220.

At step 302, a wind speed adjustment ($\Delta v$) is determined based on an outcome of the at least one previous transition from the sleep state of the wind turbine. In method 300, this adjustment is applied to the measured wind speed ($v_{meas}$).

Alternatively, as shown in method 400, the adjustment may be applied to the wake-up threshold value.

The adjustment ($\Delta v$) may be determined so as to reduce the measured wind speed ($v_{meas}$) if the outcome of the previous transition was a failed transition from the sleep state. This means that a higher measured wind speed is needed to trigger the transition to the active state, reducing the risk that the wind speed is insufficient to maintain the turbine in the active state.

Correspondingly, the adjustment ($\Delta v$) may be determined so as to increase the measured wind speed ($v_{meas}$) if the outcome of the previous transition was a successful transition from the sleep state. This means that lower measured wind speeds trigger the transition to the active state, potentially providing more time in which the turbine can be kept in the active state, for example providing more time for charging the batteries.

In some embodiments, the adjustment may be based on a plurality of previous transitions. In such embodiments, the total adjustment ($\Delta v$) determined may be based on the number of successful transitions ($n_{success}$) and the number of failed transitions in the plurality of transitions ($n_{fail}$). For example, a first incremental adjustment ($\delta v_{fail}$) may be applied for each failed transition, and a second incremental adjustment ($\delta v_{success}$) may be applied for each successful transition, so that the total wind speed adjustment equals the sum of each of the first and second incremental adjustments (i.e. $\Delta v = (\delta v_{success} \times n_{success}) - (\delta v_{fail} \times n_{fail})$).

The second incremental adjustment ($\delta v_{success}$) may be smaller than the first incremental adjustment ($\delta v_{fail}$). Such an arrangement may be preferable, so that the adjustment is biased to being more cautious. The first incremental adjustment ($\delta v_{fail}$) may for example be between 0.1 and 0.5 m/s, and may preferably be between 0.15 and 0.25 m/s. The second incremental adjustment ($\delta v_{success}$) may for example be between 0.05 and 0.3 m/s, and may preferably be between 0.05 and 0.15 m/s.

The number of transitions in the plurality of previous transitions may be limited to a predetermined number, for example between 3 and 10, or 4 and 6. This limits the maximum size of the adjustment that can be applied, to prevent large scale changes to the measured wind speed.

The plurality of previous transitions may be a predetermined number of the most recent transitions—i.e. the wake-ups immediately preceding the current time. Alternatively, the adjustment may be based on an earlier set of transitions, such as the initial wake-ups of the turbine after construction. The same adjustment may then be applied for each future wake-up attempt.

In alternative embodiments, each incremental adjustment may be individually determined, rather than being a set value. For example, each incremental adjustment may be determined based on the magnitude of the success or failure of respective wake-up attempt. In particular, and as discussed in more detail below, determining whether a transition was a success may comprise comparing a performance characteristic, such as rotor speed or power, to a predetermined threshold. If the performance characteristic exceeds the predetermined threshold, the transition may be deemed a success. In such cases, each incremental adjustment may be based on the difference between the performance characteristic and the pre-determined threshold for the respective wake-up attempt.

In some embodiments, the adjustment may be determined based only on failed wake-up attempts in the plurality of transitions, ignoring successful wake-ups (so effectively $\delta v_{success} = 0$).

In some embodiments, determining the adjustment may comprise retrieving a previously determined adjustment, for example looking up a value for the adjustment in a memory associated with the wind turbine 100. The retrieved adjustment may then be used as the current adjustment, or may be updated to take into account a recent wake-up attempt.

Once the adjustment has been determined, the method proceeds to step 303. At step 303, the determined adjustment is applied to the measured wind speed to generate an adjusted wind speed.

The method then proceeds to step 304, at which the adjusted wind speed is compared to the wake-up threshold. In particular, it is determined whether the adjusted wind speed exceeds the wake-up threshold.

The wake-up threshold may be stored in a memory associated with the wind turbine 100, for example associated with control system 200. Adjusting the wind speed may comprise retrieving the wake-up threshold from the memory. The wake-up threshold may be a default setting, for example used for all wind turbines of a particular type, or may be configured for the particular wind turbine 100, or location of the wind turbine.

If it is determined that the adjusted wind speed exceeds the wake-up threshold (represented by decision step 305 in FIG. 3), the method proceeds to step 306, at which the wind turbine 100 is transitioned from the sleep state to an active state.

The active state is a state in which at least one dormant system is woken-up. It may be a charging state, in which the wind turbine 100 generates power to charge the on-board battery, but does not supply electricity to the grid 204 (as the grid 204 is unavailable).

Transitioning the wind turbine 100 to the active state may comprise determining which of a plurality of active states to transition to, for example based on the measured wind speed. The step of transitioning may be performed by the main controller 220, for example by sending signals to activate sub-systems of the control system 200.

Transitioning to an active state may in particular comprise adjusting the pitch of the blades 106 using pitch controller 207. In the sleep phase, the pitch of the blades 106 may be set to 90°. Transitioning the wind turbine 100 to an active state may comprise reducing the pitch angle of the blades 106 to a wake-up pitch setting intended to facilitate turbine rotation.

The success or failure of the transition may then be recorded, for example stored in a memory associated with the wind turbine 100, to be used in future wind speed adjustments. A stored adjustment value may be updated based on the transition, to generate an adjustment that can be applied in future wind speed adjustments, as discussed above in relation to step 302.

If, on the other hand, the adjusted wind speed does not exceed the threshold, the wind turbine 100 is maintained in the sleep state. The method 300 then returns to step 301, at which a new wind speed is measured, for example after a predetermined time period.

It is noted that step 302 of method 300 may be performed before step 301—i.e. the adjustment may be determined (or a previously determined value retrieved) before the current wind speed is measured.

The method 300 may further comprise determining whether one or more previous transitions from the sleep state were successful, or were a failure. A wake-up transition may be considered successful if the transition to the active state was achieved within a predetermined period of time. The predetermined period of time may be between 2 and 10 minutes. For example, where the active state is a charging state, the transition may be deemed successful where a sustained supply of power is provided to the battery within the predetermined period. Alternatively or additionally, the transition may be considered successful if the rotor speed or power generated by the turbine 100 reaches a respective threshold. The threshold may be based on the specific active state. For example, the threshold may be a proportion of the maximum (e.g. rated) rotor speed/power for that operational state, such as 5%-10% of the maximum.

In method 300, it is the measured wind speed that is adjusted, and the adjusted wind speed compared to an unadjusted wake-up threshold. Equivalently, however, the adjustment may be applied to the threshold, and the unadjusted measured wind speed may be compared to the adjusted threshold.

FIG. 4 illustrates a method 400 of transitioning a wind turbine 100 from a sleep state, in which the threshold, rather than the wind speed, is adjusted. Each step of method 400 is substantially similar to the corresponding step of method 300, but with the adjustment determined for, and applied to, the threshold.

At step 401, the wind speed is measured by a wind speed system of the wind turbine, as described in relation to step 301.

At step 402, an adjustment is determined based on an outcome of at least one previous transition from the sleep state of the wind turbine 100.

As the adjustment in step 402 will be applied to the threshold, it is determined to increase the threshold where the previous transition was a failure, and to decrease the threshold where the previous transition was a success. In other words, the adjustment may be of the same magnitude as that determined in step 302, but with the opposite sign. Any of the methods of determining the threshold discussed in step 302 may equally be applied to step 402, albeit with the sign of the determined adjustment or incremental adjustment changed to account for the change from wind speed to threshold.

At step 403, the adjustment is applied to the threshold to generate an adjusted threshold. The wake-up threshold to which the adjustment is applied may be a standard threshold for the wind turbine 100, for example stored in a memory associated with the wind turbine 100.

At step 404, the measured wind speed is compared to the adjusted threshold.

If the measured wind speed exceeds the adjusted wake-up threshold (represented by decision step 405 in FIG. 4), the method proceeds to step 406, at which the wind turbine 100 is transitioned to an active state. Otherwise, the method returns to step 401, for example after a predetermined period of time.

As discussed in relation to method 300, the adjustment may be determined before measuring the wind speed. For example, the adjustment may be incrementally updated after each wake-up attempt, and stored in a memory. The stored adjustment can then be retrieved when needed to be compared to a wind speed.

Any of the methods described above may be incorporated into a computer program, which, when executed by a processor (e.g. of the main controller 200), cause the processor to perform the steps of the above methods. The steps of the method may be stored on a computer readable medium, for example a non-transitory computer readable medium.

Although the invention has been described above with reference to one or more preferred embodiments, it will be appreciated that various changes or modifications may be made without departing from the scope of the invention as defined in the appended claims.

The invention claimed is:

1. A method of transitioning a wind turbine from a sleep state, in the sleep state the wind turbine being disconnected from an external power grid and being powered by an internal power source, in the sleep state the wind turbine is not providing power to non-essential systems and is providing power to essential systems, the essential systems include a wind sensor at the wind turbine and sub-control system to which the wind sensor is connected, the method comprising:
measuring a wind speed using the wind sensor at the wind turbine to obtain a measured wind speed;
adjusting either the measured wind speed or a wake-up threshold based on an outcome of at least one previous transition from the sleep state of the wind turbine;
comparing the measured wind speed to the wake-up threshold; and
when the wind speed exceeds the wake-up threshold, transitioning the wind turbine from the sleep state to an active state, wherein, in the active state, the wind turbine:
remains disconnected from the external power grid;
remains powered by the internal power source; and
provides power to at least some of the non-essential systems.

2. The method of claim 1, wherein when the outcome of the at least one previous transition is a failed transition from the sleep state, adjusting the measured wind speed or wake-up threshold comprises:
reducing the measured wind speed or increasing the wake-up threshold.

3. The method of claim 1, wherein when the outcome of the at least one previous transition is a successful transition from the sleep state, adjusting the measured wind speed or wake-up threshold comprises:
increasing the measured wind speed or decreasing the wake-up threshold.

4. The method of claim 1, wherein adjusting the measured wind speed or wake-up threshold comprises:
determining a number of successful and failed transitions in a plurality of previous transitions of the wind turbine; and
adjusting the measured wind speed or wake-up threshold based on the number of successful and/or failed transitions.

5. The method of claim 4, wherein the transitions in the plurality of previous transitions comprise a predetermined number of most-recent transitions from the sleep state of the wind turbine.

6. The method of claim 4, wherein adjusting the measured wind speed or wake-up threshold comprises:
reducing the measured wind speed or increasing the wake-up threshold by a first adjustment for each failed transition in the plurality of previous transitions; and/or
increasing the measured wind speed or decreasing the wake-up threshold by a second adjustment for each successful transition in the plurality of previous transitions.

7. The method of claim 6, wherein the first adjustment is less than the second adjustment.

8. The method of claim 6, wherein the first adjustment and/or the second adjustment is based on a magnitude of the success or failure of the respective previous transition.

9. The method of claim 1, wherein adjusting the measured wind speed or wake-up threshold comprises applying a previously determined adjustment to the respective one of the measured wind speed and wake-up threshold.

10. The method of claim 1, wherein an outcome of a previous transition is determined to be a success if the transition to an active state was achieved within a predetermined time.

11. The method of claim 1, wherein an outcome of a previous transition is determined to be a success if a rotor speed or power generation of the wind turbine exceeds a predetermined threshold.

12. The method of claim 1, wherein the active state is a charging state of the wind turbine where produced power is provided to the internal power source to charge the internal power source.

13. The method of claim 1, wherein the active state is a power producing state of the wind turbine, where produced power is provided to a power consumer not being the external power grid or connected to the external power grid.

14. The method of claim 1, wherein the internal power source is on-board rechargeable batteries.

15. A non-transitory memory storing a computer program comprising instructions which, when executed by a computer, cause the computer to carry out an operation transitioning a wind turbine from a sleep state in which the wind turbine is disconnected from an external power grid, is powered by an internal power source, is not providing power to non-essential systems and is providing power to essential systems; wherein the essential systems include a wind speed measurement system; the operation, comprising:
measuring a wind speed using the wind speed measurement system to obtain a measured wind speed;
adjusting either the measured wind speed or a wake-up threshold based on an outcome of at least one previous transition from the sleep state of the wind turbine;
comparing the measured wind speed to the wake-up threshold; and
when the wind speed exceeds the wake-up threshold, transitioning the wind turbine from the sleep state to an active state, wherein, in the active state, the wind turbine:
remains disconnected from the external power grid;
remains powered by the internal power source; and
provides power to at least some of the non-essential systems.

16. A wind turbine comprising:
a wind speed measurement system; and
a controller configured to receive a wind speed measurement from the wind speed measurement system;
wherein the controller is configured to perform an operation transitioning the wind turbine from a sleep state in which the wind turbine is disconnected from an external power grid, is powered by an internal power source, is not providing power to non-essential systems and is providing power to essential systems; wherein the essential systems include the wind speed measurement system and the controller; the operation, comprising:
measuring a wind speed using the wind speed measurement system to obtain a measured wind speed;
adjusting either the measured wind speed or a wake-up threshold based on an outcome of at least one previous transition from the sleep state of the wind turbine;
comparing the measured wind speed to the wake-up threshold; and
when the wind speed exceeds the wake-up threshold, transitioning the wind turbine from the sleep state to an active state, wherein, in the active state, the wind turbine:

remains disconnected from the external power grid;
remains powered by the internal power source; and
provides power to at least some of the non-essential systems.

17. The wind turbine of claim 16, wherein when the outcome of the at least one previous transition is a failed transition from the sleep state, adjusting the measured wind speed or wake-up threshold comprises:
reducing the measured wind speed or increasing the wake-up threshold.

18. The wind turbine of claim 16, wherein when the outcome of the at least one previous transition is a successful transition from the sleep state, adjusting the measured wind speed or wake-up threshold comprises:
increasing the measured wind speed or decreasing the wake-up threshold.

19. The wind turbine of claim 16, wherein adjusting the measured wind speed or wake-up threshold comprises:
determining the number of successful and failed transitions in a plurality of previous transitions of the wind turbine; and
adjusting the measured wind speed or wake-up threshold based on the number of successful and/or failed transitions.

20. The wind turbine of claim 19, wherein the transitions in the plurality of previous transitions comprise a predetermined number of the most-recent transitions from the sleep state of the wind turbine.

* * * * *